S. G. WINGQUIST.
SELF ADJUSTING BALL BEARING.
APPLICATION FILED NOV. 14, 1908.

980,582.

Patented Jan. 3, 1911.
5 SHEETS—SHEET 1.

Witnesses:
John A. Rennie
A. F. Cornwell

Inventor:
Sven G. Wingquist
By
Attorney

S. G. WINGQUIST.
SELF ADJUSTING BALL BEARING.
APPLICATION FILED NOV. 14, 1908.

980,582.

Patented Jan. 3, 1911.
5 SHEETS—SHEET 2.

Witnesses:

Inventor:
Sven G. Wingquist
By
Attorney.

S. G. WINGQUIST.
SELF ADJUSTING BALL BEARING.
APPLICATION FILED NOV. 14, 1908.

980,582.

Patented Jan. 3, 1911.
5 SHEETS—SHEET 4.

Witnesses:

Inventor:
Sven G. Wingquist
By
Attorney.

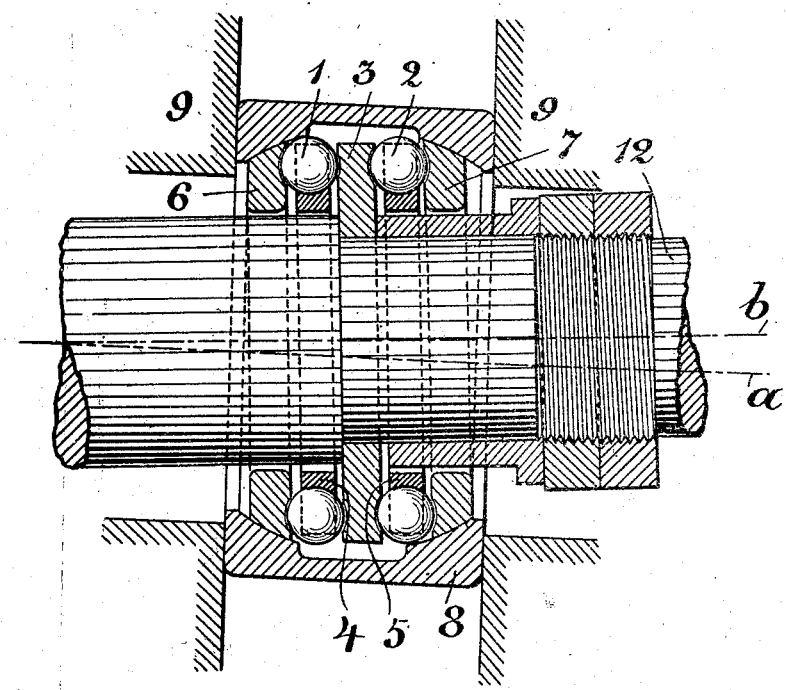

UNITED STATES PATENT OFFICE.

SVEN GUSTAF WINGQUIST, OF GOTTENBORG, SWEDEN.

SELF-ADJUSTING BALL-BEARING.

980,582.

Specification of Letters Patent.   Patented Jan. 3, 1911.

Application filed November 14, 1908.  Serial No. 462,657. REISSUED

*To all whom it may concern:*

Be it known that I, SVEN GUSTAF WINGQUIST, a subject of the King of Sweden, and resident of Gottenborg, in the Kingdom of Sweden, have invented certain new and useful Improvements in or Relating to Self-Adjusting Ball-Bearings, of which the following is a specification, reference being had therein to the accompanying drawings.

This invention relates to ball-bearings, especially adapted for axial pressure, which bearings can easily be mounted. These bearings are self-adjusting, *i. e.*, so constructed, that an oblique position of the shaft or the moving of the same radially has no influence at all upon the bearings.

The bearing is composed partly of an outer ring, made in one piece, partly of inner parts, consisting of one or more ball-sets around the shaft, and of rings on both sides of said ball-set or ball-sets, which rings form bearing surfaces for the balls and in their turn bear against surfaces on the outer ring, which form parts of the same sphere or substantially so. Notches, provided in the inner side of the outer ring, or the fact that parts of the inner rings are cut away, make possible the mounting of the inner parts into the outer ring, without the aid of the usual ring shaped cover or the like, screwed into the bearing to keep the inner parts in position.

Figure 1:
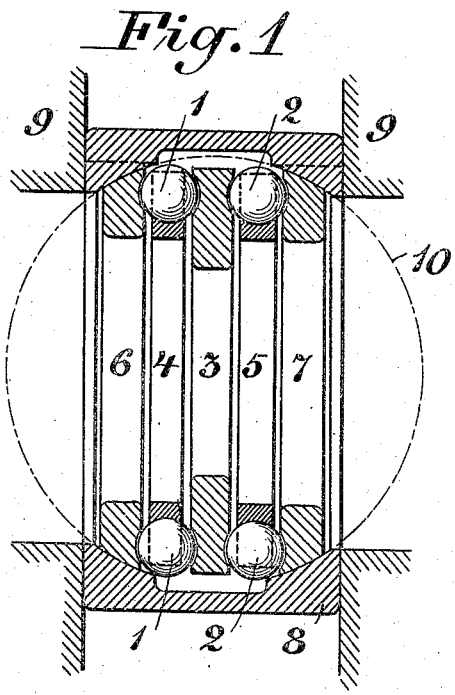
Figure 2:
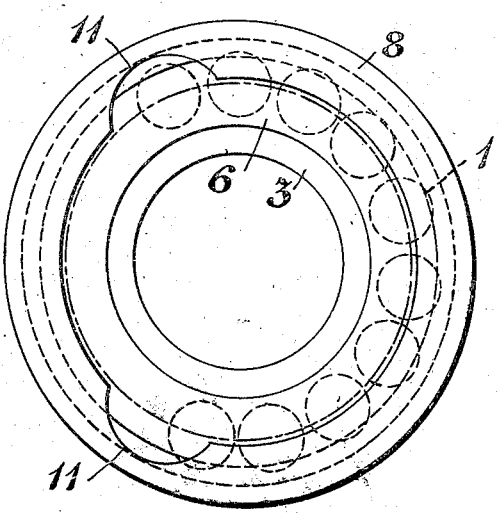
Figure 3:
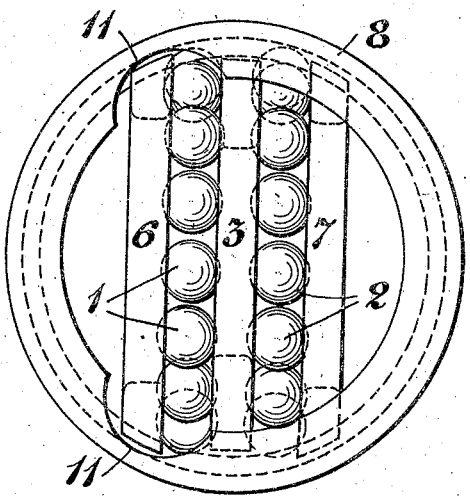
Figure 4:
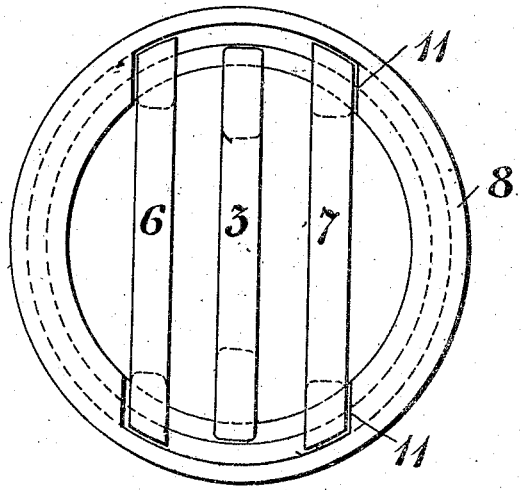
Figure 5:
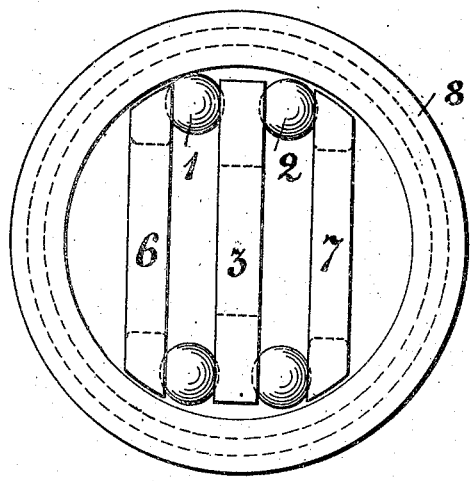
Figure 6:
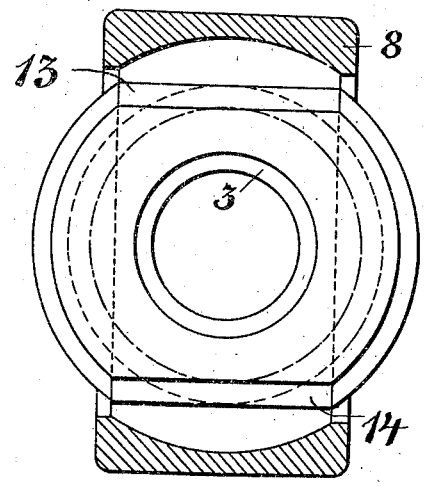
Figure 7:
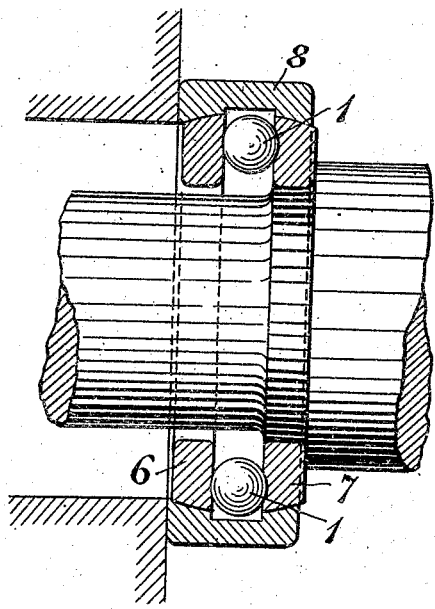
Figure 8:
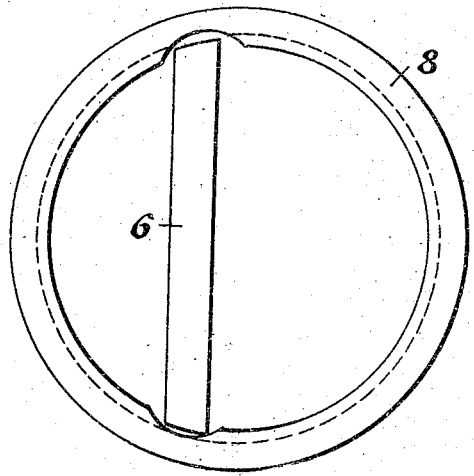

In the accompanying drawings Figure 1 is an axial section of a bearing arranged in accordance with this invention. Fig. 2 is a side view of the same. Fig. 3 is a side view of the bearing but shows the inner parts turned as a whole through 90° *i. e.* into such position that they can be inserted into the bearing or withdrawn from the same. Fig. 4 is a view somewhat similar to Fig. 3, but illustrating a modified formation of the improved bearing with its ball sets omitted; Fig. 5 is a view somewhat similar to Fig. 3, but illustrating another modification; Fig. 6 is a vertical section taken through the form of bearing shown in Fig. 5, the ball sets being omitted; Fig. 7 is a sectional detail view somewhat similar to Fig. 1, but illustrating still another modified formation of the bearing comprised in my present invention; Fig. 8 is a detail view showing certain features of construction of the bearing illustrated in Fig. 7, and Fig. 9 is a view similar to Fig. 1, but illustrating the application of the shaft to the improved bearing.

1 and 2 are two sets of balls, 3 is a ring, located between the said sets and fixed on the shaft in any suitable manner, 4 and 5 are rings disposed in the same planes as the ball-sets respectively and provided with grooves, projections or the like, embracing the balls, 6 and 7 are side rings and 8 is the outer ring.

9, 9, Fig. 1, designate parts of the frame of the bearing forming bearing surfaces for the outer ring.

The rings 6 and 7 support the ball-sets 1 and 2 from each side respectively longitudinally of the shaft and the outer sides of the said rings bear against the inner side of the ring 8 forming parts of a sphere 10, the center of which is situated on the center line of the ring 8. The pressure from the shaft is transmitted by the ball-sets either to the ring 6 or to the ring 7, and thus to the ring 8, which is prevented by the parts 9, 9 from moving longitudinally of the shaft. Owing to the spherical bearing surfaces of the ring 8 and the rings 6 and 7 the said pressure is distributed uniformly on all the balls of the set even if the shaft and the ring 3 should not run regularly. Owing to the fact that the ring 8 has plane end surfaces and can move transversely in its own plane between the parts 9, 9, the bearing as a whole can be moved radially, in consequence whereof the shaft can occupy an oblique position to the center line of the ring 8 and at the same time, a lateral position, as shown in Fig. 9, in which the line *b* indicates the said position of the shaft 12 and the line *a* the ordinary position of the same. As seen from Fig. 1, the outer ring is made in one piece.

For the insertion of the inner parts into the ring 8, the latter is provided at both its inner edges with recesses 11, 11, so adapted that the rings, when so placed that they form an angle of 90° with the ring 8, can be put into the same, Fig. 3. By inserting the inner rings in the said manner and then moving the same sidewise the rings can easily be mounted in the outer ring and the balls between the same, the ring being then turned into the position shown in Fig. 1.

The modification shown in Fig. 4 consists in the recesses 11, 11 being provided only in one of the inner edges but being made so wide, that the inner parts as a whole can be inserted into the ring 8 and then turned in the same.

The modification shown in Figs. 5 and 6 consists in the recesses 11, 11, in the ring 8 being dispensed with and parts of the inner rings being cut away at 13, 14, in the periphery along two chords, situated diametrically opposite each other, to such an extent, that the rings can be introduced into the ring 8, and then turned. The diameter of the ball track is so adapted, that the track is not affected by parts being thus cut away.

Figs. 7 and 8 show a bearing constructed in the described manner but provided with only one set of balls.

In addition to the self-adjusting capacity of the described bearing and the easy manner in which the parts of the bearing can be assembled, it has the great advantage that it cannot be tightened and consequently cannot be damaged by being carelessly tightened. The adjusting is effected during the manufacturing of the bearing and no adjusting is thereafter necessary.

Having now described my invention, what I claim as new and desire to secure by Letters Patent is:

1. A self-adjusting bearing having an outer ring, a ball set, inner rings located at opposite sides of the ball set and provided with concentric spherical surfaces contacting upon corresponding surfaces within said outer ring, a shaft and means for transmitting the axial pressure of the shaft to said outer ring through the balls, said ring being provided with a space at one side for the introduction of the inner rings and ball set within said ring.

2. A self-adjusting bearing having two ball sets, lateral inner rings located at opposite sides of the ball sets, an outer ring inclosing said ball sets and lateral inner rings and having spherical surfaces whereon said lateral rings having corresponding surfaces are engaged, and an intermediate inner ring engaged between the respective ball sets and adapted for supporting engagement with the shaft, said outer ring being provided with a space at one side for the introduction of the inner ring and ball sets within said outer ring.

3. A self-adjusting bearing having an integral outer ring, a ball set, inner rings located at opposite sides of the ball set and provided with concentric spherical surfaces contacting upon corresponding surfaces within said outer integral ring, and means for transmitting the axial pressure of the shaft to said outer ring through the balls, said integral outer ring being provided with means for the introduction of the inner rings and ball set within said outer ring.

4. A self-adjusting bearing having an integral outer ring, a ball set, inner rings located at opposite sides of the ball set and provided with concentric spherical surfaces contacting upon corresponding surfaces within said outer integral ring, and means for transmitting the axial pressure of the shaft to said outer ring through the balls, said integral outer ring being provided with means for the introduction of the inner rings and ball set within said outer ring, when turned at approximately right-angles thereto.

5. A self-adjusting bearing having an integral outer ring, a ball set, inner rings located at opposite sides of the ball set and provided with concentric spherical surfaces contacting upon corresponding surfaces within said outer integral ring, means for transmitting the axial pressure of the shaft to said outer ring through the ball set, the inner rings and the outer ring being relatively so shaped as to permit the introduction of the inner rings and ball set within said outer ring when turned at an angle thereto.

In witness whereof, I have hereunto signed my name in the presence of two subscribing witnesses.

SVEN GUSTAF WINGQUIST.

Witnesses:
 AROF PALM,
 HELMER KIRSTEN.